(12) United States Patent
Liu et al.

(10) Patent No.: US 9,722,706 B1
(45) Date of Patent: Aug. 1, 2017

(54) MULTIPLE WAVELENGTH LIGHT-SOURCE WITH TRACKING MULTIPLEXER

(71) Applicant: Kaiam Corp., Newark, CA (US)

(72) Inventors: Alice Liu, Newark, CA (US); Bardia Pezeshki, Menlo Park, CA (US); John Heanue, Boston, MA (US); Henk Bulthuis, Newark, CA (US)

(73) Assignee: KAIAM CORP., Newark, CA (US)

( * ) Notice: Subject to any disclaimer, the term of this patent is extended or adjusted under 35 U.S.C. 154(b) by 0 days.

(21) Appl. No.: 14/281,561

(22) Filed: May 19, 2014

Related U.S. Application Data (60) Provisional application No. 61/824,869, filed on May 17, 2013.

(51) Int. Cl.
*H04J 14/02* (2006.01)
*H04B 10/50* (2013.01)
*G02B 6/12* (2006.01)

(52) U.S. Cl.
CPC ....... *H04B 10/506* (2013.01); *G02B 6/12009* (2013.01); *G02B 6/12011* (2013.01); *G02B 6/12014* (2013.01)

(58) Field of Classification Search
CPC ............ G02B 6/12009; G02B 6/12011; G02B 6/12014; H04B 10/506
USPC ................................................ 398/87, 79, 82
See application file for complete search history.

(56) References Cited

U.S. PATENT DOCUMENTS

| | | | |
|---|---|---|---|
| 6,738,545 B1 | 5/2004 | Purchase et al. | |
| 6,757,469 B2 * | 6/2004 | Bauer et al. | 385/129 |
| 6,870,978 B2 * | 3/2005 | Purchase et al. | 385/14 |
| 6,873,761 B2 * | 3/2005 | Yoneda | G02B 6/10 385/10 |
| 6,954,566 B2 * | 10/2005 | Johannessen | G02B 6/12014 385/37 |
| 7,058,249 B2 * | 6/2006 | Purchase et al. | 385/14 |
| 7,062,127 B2 | 6/2006 | Purchase et al. | |
| 7,397,986 B2 * | 7/2008 | Bulthuis | G02B 6/12014 385/37 |
| 7,689,072 B2 * | 3/2010 | Bulthuis | G02B 6/12014 385/14 |
| 7,869,711 B2 * | 1/2011 | Ji et al. | 398/79 |
| 7,912,330 B2 | 3/2011 | Rhee et al. | |
| 8,873,910 B2 * | 10/2014 | Bulthuis | G02B 6/12011 385/132 |
| 8,917,963 B2 * | 12/2014 | Pezeshki et al. | 385/52 |
| 2003/0174991 A1 * | 9/2003 | Bauer et al. | 385/129 |
| 2003/0175005 A1 * | 9/2003 | Bauer et al. | 385/145 |
| 2004/0013337 A1 * | 1/2004 | Purchase et al. | 385/14 |
| 2005/0100265 A1 * | 5/2005 | Purchase et al. | 385/14 |

(Continued)

OTHER PUBLICATIONS

Shin Kamei et al. "Recent progress on athermal AWG wavelength multiplexer", Active and Passive Optical Components for WDM Communications V, Proc. of SPIE vol. 6014, 60140H1-9, (2005).

*Primary Examiner* — Ken N Vanderpuye
*Assistant Examiner* — Abbas H Alagheband
(74) *Attorney, Agent, or Firm* — Klein, O'Neill & Singh, LLP (57) ABSTRACT

A transmitter assembly incorporating multiple laser diodes that are wavelength multiplexed together using a planar lightwave circuit, and where the multiplexer's transmission spectrum depends on temperature at the same rate as the laser diodes. This allows a design for lower loss in the multiplexer and therefore is more power efficient.

8 Claims, 7 Drawing Sheets

(56) References Cited

U.S. PATENT DOCUMENTS

| | | | |
|---|---|---|---|
| 2005/0135778 A1* | 6/2005 | Dominic | B82Y 20/00 385/147 |
| 2006/0198579 A1* | 9/2006 | Bulthuis | G02B 6/12014 385/37 |
| 2007/0116468 A1* | 5/2007 | Ji et al. | 398/79 |
| 2008/0019640 A1* | 1/2008 | Blum | G02B 6/12011 385/37 |
| 2008/0080864 A1* | 4/2008 | Bai | G02B 6/12019 398/79 |
| 2008/0226232 A1* | 9/2008 | Bulthuis | G02B 6/12014 385/37 |
| 2010/0166425 A1* | 7/2010 | Onaka | 398/79 |
| 2012/0195551 A1* | 8/2012 | Pezeshki et al. | 385/33 |
| 2013/0094853 A1* | 4/2013 | Mizutani et al. | 398/34 |
| 2013/0101252 A1* | 4/2013 | Rasras | G02B 6/12026 385/24 |
| 2013/0243432 A1* | 9/2013 | McGreer | G02B 6/12033 398/49 |

* cited by examiner

MULTIPLE WAVELENGTH LIGHT-SOURCE WITH TRACKING MULTIPLEXER

CROSS REFERENCE TO RELATED APPLICATIONS

This application claims the benefit of the filing of U.S. Provisional Patent Application No. 61/824,869, filed on May 17, 2013, the disclosure of which is incorporated by reference herein.

BACKGROUND OF THE INVENTION

The present application relates to the field of fiber optic communication and, more particularly, to optical packaging techniques and designs used for multiple wavelength transmitters.

In the past few decades, optics has gradually become the favored media for transmitting high bandwidths of information. Compared to electrical cabling, fiber optics can transmit modulated light for extreme distances with low loss and low distortion. As the bandwidth requirements in datacenters and between switches and routers have increased, optical links are becoming necessary in ever shorter domains. Thus gradually optics has migrated from long haul, to metro, and now to enterprise and datacenters. In previous decades the signal bandwidth through a fiber has increased generally by modulating the lasers faster and having higher speed photodetectors on the receiver. Thus the industry went from 622 Mbits/second to 2.5 Gb/s and then 10 Gb/s. But now it is becoming harder to have the direct line rate exceed 10 Gb/s or 25 Gb/s. Thus to get to higher speeds, it is generally necessary to put parallel channels within the same fiber, where 40 Gb/s, for example, is achieved using four lanes of 10 Gb/s.

This parallelism can be achieved in a number of ways. Most simply, one could use a ribbon fiber, where there is 10 Gb/s modulated light in each fiber. Alternatively, one could use a more advanced modulation scheme, where the signal has multiple levels, or is modulated in phase as well as amplitude thus achieving multiple bits per symbol. Perhaps the most practical way is to use multiple wavelengths of light, with each signal modulating a light beam of a different wavelength. Because the intrinsic bandwidth of an optical fiber is very high, all the different wavelengths can be multiplexed with a dispersive element such as a diffraction grating into a single fiber. At the receiver end, the wavelengths are demultiplexed and received separately using another matching grating and a photodiode array. Thus 40 Gb/s can be transmitted in four lanes of 10 Gb/s each, at four different wavelengths.

This Wavelength Division Multiplexing (WDM) approach has already been in use extensively in long haul or metro optical links. Typically 40 or 80 channels are multiplexed into one fiber. The problem with using this same technique for shorter distances is that the temperature of the lasers and the multiplexer must be accurately controlled as the optical wavelength of a laser and a multiplexer are both temperature-dependent. Typically in a semiconductor laser, the wavelength of generated light varies at about 0.1 nm per degree Centigrade. The optical passband of a wavelength multiplexer also varies with temperature, but at a slower rate of about 0.01 nm per degree Centigrade. To have 40 or 80 wavelengths all in the same fiber, within the 30 nm range than can be easily amplified using conventional erbium-doped fiber amplifiers, the wavelengths have to be closely spaced at 100 GHz (0.8 nm) or 50 GHz (0.4 nm) spacing. As the equipment temperature varies from −5 C to 75 C, without temperature control a laser would change wavelengths by 8 nm, and a multiplexer by 0.8 nm, in both cases enough to run over other channels. Thus all the optical components are carefully temperature controlled, either with heaters or thermoelectric Peltier coolers.

An alternative for smaller distance optical interconnects that eliminates the precise temperature control is to spread out the wavelength range beyond the 30 nm of an optical fiber span, reduce the number of channels, and also dramatically increase the wavelength spacing between lasers. For example, for 40 Gb/s applications, four 10 Gb/s channels are used over a 60 nm span, with wavelengths at 1270 nm, 1290 nm, 1310 nm, and 1330 nm. With 20 nm spacing, even if the output wavelength of the laser moves by 8 nm, it will not run over adjacent channels. The shift of the output wavelength of the multiplexer of 0.8 nm is inconsequential, so no cooling is necessary. However, one still has misalignment between the output wavelengths of the lasers and the passband center frequencies of the multiplexer. If the wavelengths of the laser output and the multiplexer passband center frequency are aligned at the midpoint of the temperature range, than at the low end of the temperature range, the laser wavelength is too short by 3.6 nm, and at the high end of the temperature range, the laser wavelength is too long by 3.6 nm.

To account for this variation of wavelength with temperature, multiplexers with semi-Gaussian or flat-topped passbands may be used, but such multiplexers tend to have increased insertion loss for passbands covering an appreciable portion of the wavelengths of a channel. For example, in practical implementations, the passband wavelength of the multiplexer may be "flat-topped," allowing good multiplexing across a 2×3.6 nm or 7.2 nm temperature range. Unfortunately, when one fabricates a flat-topped multiplexer that goes from single mode inputs to a single mode output, the insertion loss is much higher than compared to a standard Gaussian multiplexer. Flat-topped multiplexers, while having a widened passband, therefore induce additional loss, which makes the transmitter inefficient and increases power consumption.

BRIEF SUMMARY OF THE INVENTION

Aspects of the invention provide a plurality of lasers coupled with a multiplexer having a temperature dependent passband wavelength shift matched to laser temperature dependent output wavelength shift. In some embodiments the multiplexer is of a "superthermal" design, with passband characteristics that change much more with temperature. This matches the wavelength drift with temperature of the multiplexer passband with the wavelength drift with temperature of the laser output, such that the wavelengths of the light from the light sources and the multiplexer passband vary together. This allows the use of a "Gaussian" rather than a "flat-topped" design in the grating multiplexer that is of much lower loss.

In some embodiments wavelengths of both the laser and the multiplexer passband vary together with temperature. In some embodiments the lasers and multiplexer output are not the subject of temperature control. In some embodiments an optional receiver that tracks the variation in wavelength, or in some embodiments simply allows for the variation, thus allows more channels, and many more channels in some embodiments, to be used at closer spacing, thus increasing the total bandwidth of the link.

One aspect of the invention provides a transmitter for a wavelength division multiplexing communication system, comprising: a plurality of laser light sources which output light, each of the laser light sources outputting light about different wavelengths, the wavelengths shifting with variation of temperature of the laser light sources; a planar lightwave circuit positioned to receive light from the laser light sources and combine the light, the planar lightwave circuit having a passband with a center wavelength that shifts with variation of temperature of the planar lightwave circuit, the shift in center wavelength with variation of temperature substantially matching half of the shift in wavelength of the light from the lasers with variation of temperature.

These and other aspects of the invention are more fully comprehended upon review of this disclosure.

BRIEF DESCRIPTION OF THE FIGURES

Aspects of the invention are illustrated by way of examples.

DETAILED DESCRIPTION

Multiwavelength links generally have multiple light sources packaged with a multiplexer that combines light from these sources into a single output. The sources can be directly modulated lasers, or continuous wave lasers together with separate modulator elements, for example. The sources can also incorporate drivers with the modulators or with the lasers. The light from these multiple sources, each generally at a different wavelength, are generally coupled to a chip that multiplexes the light from all the sources into a single output.

Figure 1:
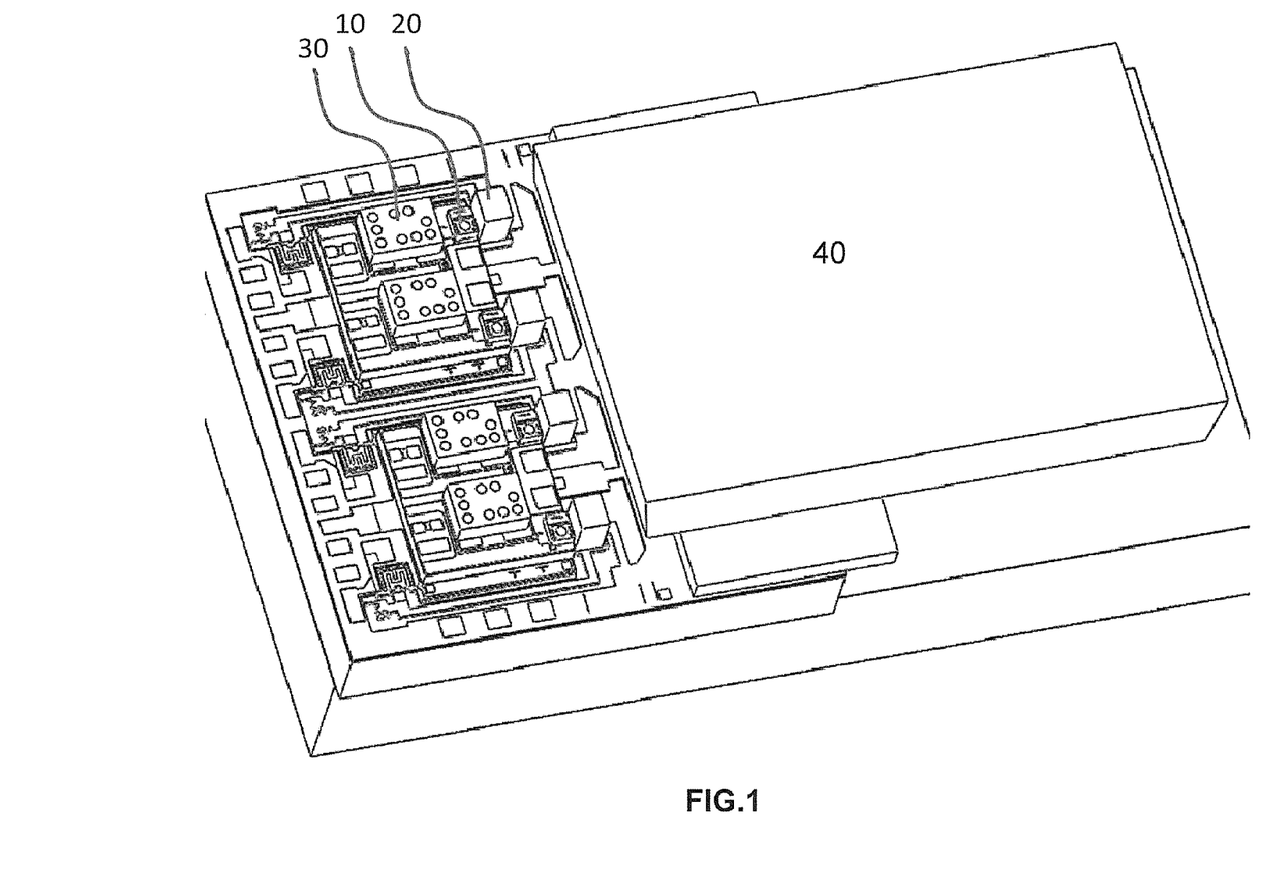
FIG. 1 shows a design for a 4×10 Gb/s multiwavelength source.

This is schematically shown in FIG. 1 for a 4×10 Gb/s transmitter. The transmitter includes a laser diode chip 10 with a laser that sends a beam of light forward into a microlens 20 that in turn focuses the beam into a planar lightwave circuit (PLC) 40. In some embodiments the laser output wavelength shift is about 0.1 nm per degree Centigrade. Behind the laser is a driver 30, which provides electrical signals to the laser diode chip. Note that there are four sets of lasers, drivers, and microlenses on the assembly of FIG. 1.

In some embodiments the lasers are distributed feedback (DFB) lasers. In various embodiments the lasers are of an InP based material, and may be for example of AlGaInAs/Inp or InGaAsP/InP. In some embodiments the microlenses are mounted on moveable arms, for example as discussed in U.S. Patent Application Publication No. 2012/0195551, entitled MEMs Based Levers and Their Use for Alignment of Optical Elements, and U.S. Patent Application Publication No. 2011/0013869, entitled Micromechanically Aligned Optical Assembly, the disclosures of which are incorporated by reference herein.

The PLC that muxes the light together is generally designed to have a passband wavelength dependence with respect to temperature which is the same as or substantially the same as that of the lasers. In some embodiments the temperature dependence may be half that of the lasers, or between half that of the lasers and the same as the lasers, or within 30% of that of the lasers. In many embodiments the PLC is made of glass, for example silica based, incorporating grooves filled with a polymer material in waveguides of the PLC. In some embodiments the polymer material is a silicone resin. In some embodiments the passband wavelength shift is about 0.1 nm per degree Centigrade. The typical operating temperature of the assembly is from −5 C to 75 C, and thus over 80 C temperature difference, one sees about an 8 nm shift in passband wavelength. As the PLC has a much greater passband wavelength shift with respect to temperature than would otherwise be expected, the PLC may be considered a "superthermal" device.

In some embodiments the superthermal device includes a groove structure filled with a material with change in refractive index with respect to temperature (dn/dT) different than the dn/dT of the core of the PLC. Preferably the dn/dT of the material is either a highly positive or highly negative dn/dT, such as the dn/dT for a silicone resin. This, for example, allows the PLC, for example an arrayed waveguide grating (AWG), to have a higher temperature dependent passband center wavelength shift that is much more closely matched to that of an active device, for example such as a semiconductor laser. By varying the groove geometries, devices with arbitrary dλ/dT can be achieved on the same silica platform. Integration with devices that have matched dλ/dT gives advantages of eliminating, in many cases, heating/cooling elements within the integrated module without compromising AWG design and performance.

Figure 2:
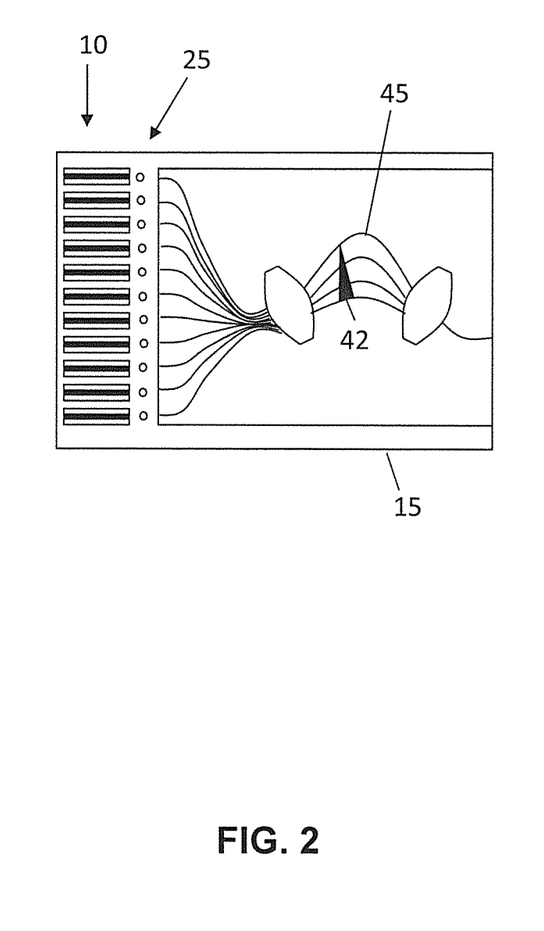
FIG. 2 shows a design for a further multiwavelength source, showing the AWG with a temperature adjustment section.

FIG. 2 shows a further embodiment in accordance with aspects of the invention. The embodiment of FIG. 2 includes a plurality of semiconductor lasers 10, for example DFB lasers. Light from each of the lasers is focused by a corresponding lens 25 into a corresponding input of an AWG 45. The lasers and the AWG are coupled to a common substrate, with intervening substrates present in some embodiments.

The AWG has a section 42, triangular in some embodiments, made in the waveguide arms that are etched out of a region of the glass in which gratings of the AWG are formed, and replaced with polymeric material with a different dn/dT than the dn/dT of the glass. In most embodiments the polymeric material, and the amount of polymeric material in each waveguide of the AWG, is selected such that the AWG is a superthermal AWG. In some embodiments the polymeric material, and its amount, are selected such that the dn/dT of the AWG matches the variation in output wavelengths with respect to temperature of the lasers. To reduce diffraction loss, in some embodiments the groove is replaced with divided grooves, for example in the form of multiple grooves, which does not allow the light to diffract considerably while in the unguided polymer. In various embodiments the waveguides may be widened to reduce loss. Though such configurations sometimes affect the polarization response of the AWG, this is generally not important for a multiplexer that operates only on a single polarization.

In general the wavelength sensitivity of a superthermal AWG is determined by the dn/dT coefficients of the waveguide and the groove filling material. The center wavelength ($\lambda_c$) of the passband of the AWG is determined by the equation below:

$$\lambda_c = \Delta L_c / m * n_c * (1 + n_p * \Delta L_p / (n_c * \Delta L_c)) \quad (1)$$

where $\Delta L_c$ is the length difference between each adjacent grating in the silica waveguide, $n_c$ is the effective refractive index of the silica grating waveguide, $\Delta L_p$ is the length difference between each groove length for adjacent grating waveguide regions, $n_p$ is the index of refraction the groove filling material, and m is the grating order.

The temperature dependence of center wavelength is given below:

$$d\lambda_c/dT = 1/m * (dn_c/dT * \Delta L_c + dn_p/dT * \Delta L_p) \quad (2)$$

where typical dn/dT values (ignoring second order temperature dependence) are:

$$dn_c/dT = 1.1 \times 10^{-5}/° \text{C., and } dn_p/dT = -37 \times 10^{-5}/° \text{C.}$$

Combining eq(1) and eq(2), $$\Delta L_p = (m * d\lambda_c/dT - dn_c/dT * \Delta L_c)/(dn_p/dT) \quad (3)$$

$$\Delta L_c = m * \lambda_c / n_c * \{[1 - (d\lambda_c/dT)/\lambda_c * n_p * (dn_p/dT)]/[1 - (n_p/n_c) * (dn_c/dT)/(dn_p/dT)]\} \quad (4)$$

By selecting an appropriate $\Delta L_p$ value, the AWG can be made to have a $d\lambda_c/dT$ that matches that of other devices like semiconductor lasers that have approximately 10 times the temperature sensitivity.

For example, for a 10 channel 400 GHz spacing AWG to match a $d\lambda/dT$ of approximately 100 pm/° C. of a laser, equations (3) and (4) may be used to calculate $\Delta L_p$ to be −7.66 um (assuming a nominal center wavelength of 1.55 um, $n_c$ of 1.4561, $n_p$=1.4, and m of 32).

Figure 3:
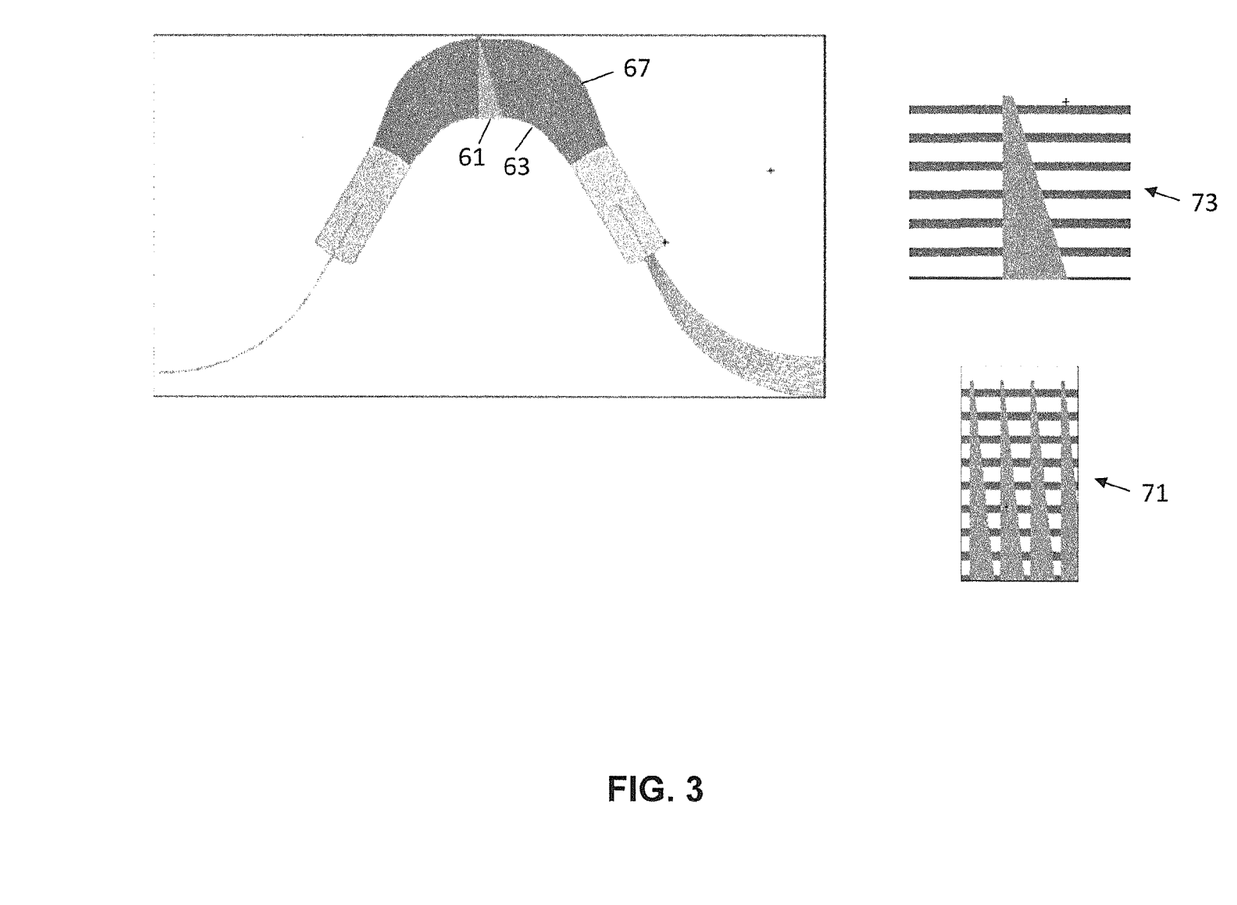
FIG. 3 shows aspects of designs for a "superthermal" multiplexer, where the region of the insert is modified to increase the thermal shift to match that of the laser diodes.

A design of an AWG based on the above is shown in FIG. 3. The AWG has 10 channels with 400 GHz spacing, and the refractive index contrast is 1.5% with a core geometry of 4 um×3.5 um. As one can see, $\Delta L_p$ is a negative number, with a triangular region 61 decreasing in width from a bottom, shorter, waveguide 63 to a top, longer, waveguide 67. To cover the 65 grating waveguides in the device, the bottom grating waveguide should have an extra length of the silicone region of 498 um compared to that of the top waveguide. As an easy way to implement this, straight waveguides of equal length can be inserted in the middle of the grating region of the AWG to accommodate a rectangular shaped etched trench that is filled with silicone. However, diffraction loss resulted from a long unguided silicone region in a single rectangle of this size may be unacceptable in many cases. Divided grooves 71 instead of a single groove 73 may be implemented to reduce diffraction loss. In this case, dividing the single rectangle into 100 equally spaced narrower rectangles, such that each silicone filled region is no more than Sum long along each grating waveguide, could improve the insertion loss of the device significantly.

Figure 4:
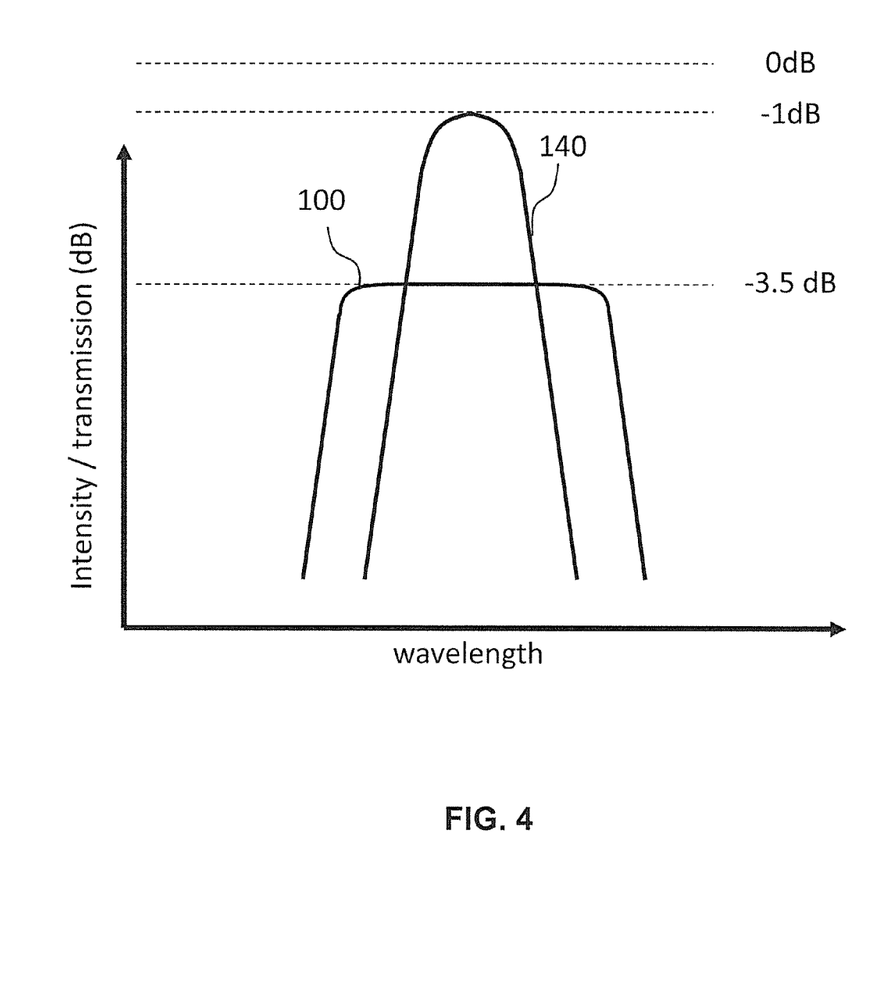
FIG. 4 shows the passband of a flat-top multiplexer and a Gaussian multiplexer.

FIG. 4 is a graph showing an example Gaussian passband response of a channel of a superthermal AWG in accordance with aspects of the invention. A first curve 140 shows an example Gaussian response of a superthermal AWG, while a second curve 100 shows an example flat-top passband response. As may be seen through a comparison of the two curves, Gaussian response has a higher peak, but passes light in a narrower range of wavelengths.

Figure 5:
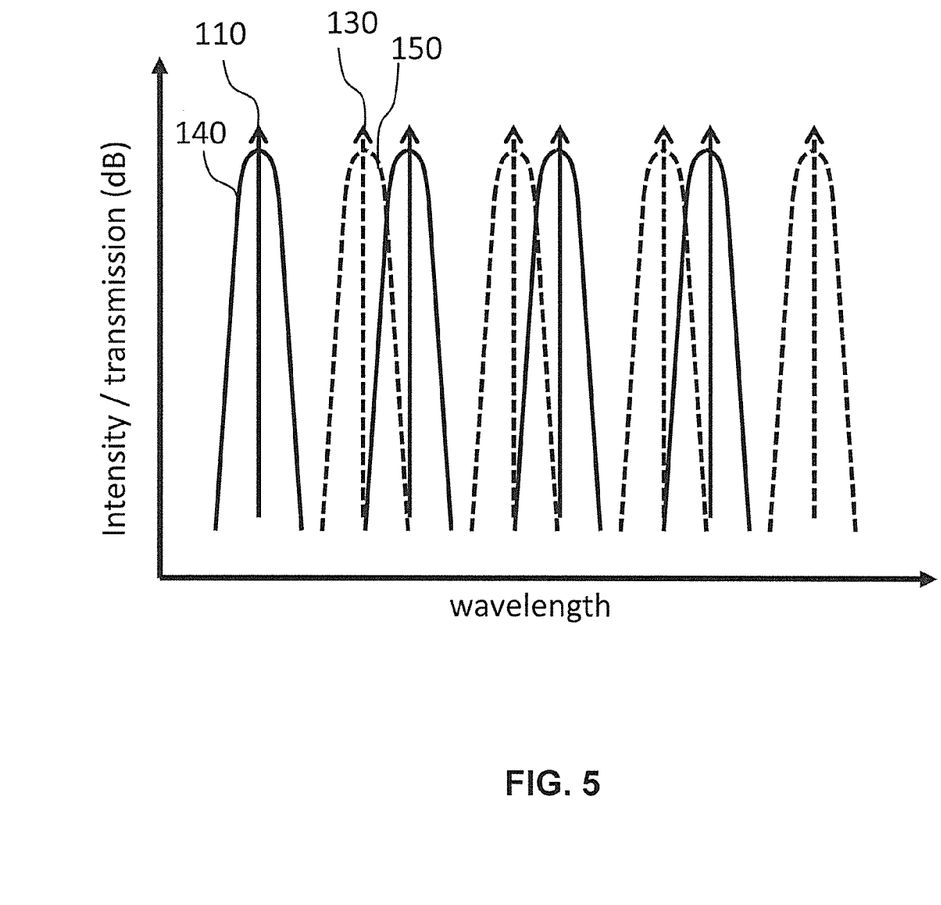
FIG. 5 shows the passband characteristics of an embodiment of the invention, where a lower loss Gaussian design multiplexer tracks the wavelength drift of the laser and thereby provides lower loss multiplexing compared to the conventional flat top passband.

FIG. 5 shows the optical characteristics of such as system, where Gaussian passbands are used that shift with temperature. 140 is the Gaussian passband curve of the first filter while 110 is the laser wavelength matched to that filter at low temperature. Once the temperature increases, the laser wavelength moves to 130, but the filter response moves the same amount to 150. The match between the laser and the filter is maintained. Since the Gaussian filter has much lower loss than the flattop, the efficiency of the module is increased and the laser can run at lower power, saving power consumption.

Commensurately, one can increase the number of channels of this uncooled system and space them closer together. All the channels will drift up and down with temperature together, and one can use a demultiplexer to track this drift and appropriately lock on to the grid. This can be done in many ways. For example, the receiver can be made tunable by controlling the temperature of the demultiplexer. Since the demultiplexer does not generate heat, it can be thermally insulated from the environment and therefore only a small amount of power from a heater would vary the temperature substantially. This would tune the filter. This heater could be made local—for example on a polymer insert into the PLC, or it could heat the entire assembly. To track, a low frequency dither tone can be placed on one channel of the transmitter. The receiver would then detect this dither tone, and adjust the temperature of the receiver with heater power such that the dither would be maximized at the appropriate channel.

Figure 6:
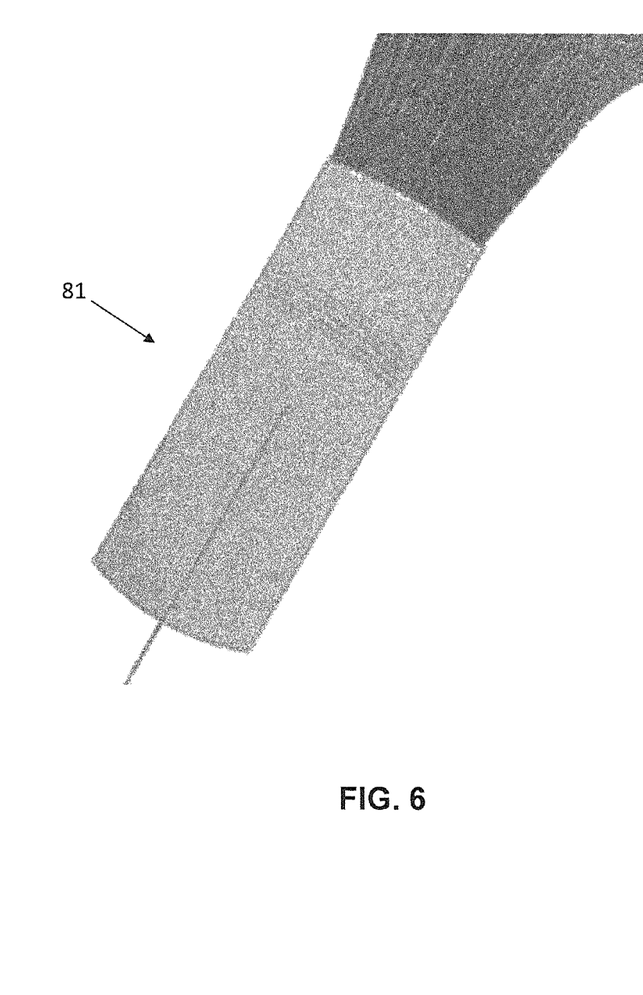
FIG. 6 shows an alternate design of the multiplexer where the region of the insert is not in the arms, but in the star region of the device.
Figure 7:
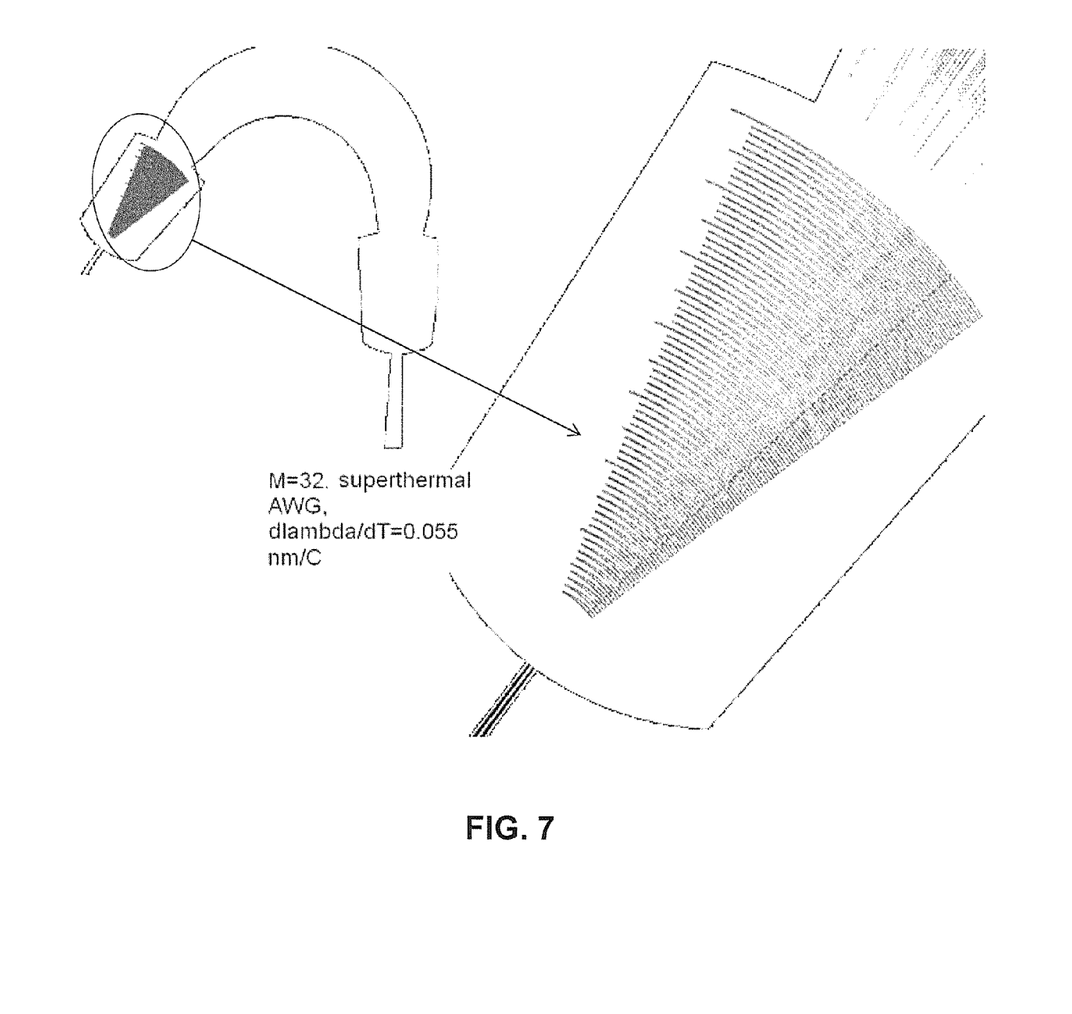
FIG. 7 shows a further alternate design of the multiplexer.

The region of different index can also be implemented in areas of the PLC other than the grating waveguides, for example the star region. FIGS. 6 and 7 show implementations where part of the slab of the PLC is etched out and replaced with polymer. The implementation is similar to the version where the grooves are in the grating region, except that the grooves here are concentrically shaped with respect to the center of the input slab region 81, so that the light in the slab region enters the silicone filled grooves at or close to normal. The effect is that same in that the beam is steered with temperature causing the center wavelength of the multiplexer to shift much more dramatically with temperature.

Although the invention has been discussed with respect to various embodiments, it should be recognized that the invention comprises the novel and non-obvious claims supported by this disclosure.

What is claimed is:

1. A transmitter for a wavelength division multiplexing communication system, comprising:
    a plurality of laser light sources which output light, each of the laser light sources outputting light about different wavelengths, the wavelengths shifting with variation of temperature of the laser light sources;
    a planar lightwave circuit positioned to receive light from the laser light sources and combine the light, the planar lightwave circuit having a passband with a center wavelength that shifts with variation of temperature of the planar lightwave circuit, a shift in center wavelength with variation of temperature substantially matching half of a shift in wavelength of the light from the lasers with variation of temperature.

2. The transmitter of claim 1, wherein the planar lightwave circuit comprises an arrayed waveguide grating (AWG).

3. The transmitter of claim 2, wherein the AWG includes a polymeric material in a grating region of the AWG.

4. The transmitter of claim 3, wherein the polymeric material fills an etched trench in the grating region.

5. A transmitter for a wavelength division multiplexing communication system, comprising:
  a plurality of laser light sources which output light, each of the laser light sources outputting light about different wavelengths, the wavelengths shifting with variation of temperature of the laser light sources;
  a planar lightwave circuit positioned to receive light from the laser light sources and combine the light, the planar lightwave circuit having a passband with a center wavelength that shifts with variation of temperature of the planar lightwave circuit, a shift in center wavelength with variation of temperature substantially matching thirty percent of a shift in wavelength of the light from the lasers with variation of temperature.

6. The transmitter of claim 5, wherein the planar lightwave circuit comprises an arrayed waveguide grating (AWG).

7. The transmitter of claim 6, wherein the AWG includes a polymeric material in a grating region of the AWG.

8. The transmitter of claim 7, wherein the polymeric material fills an etched trench in the grating region.

* * * * *

UNITED STATES PATENT AND TRADEMARK OFFICE
CERTIFICATE OF CORRECTION

PATENT NO. : 9,722,706 B1
APPLICATION NO. : 14/281561
DATED : August 1, 2017
INVENTOR(S) : Alice Liu et al.

Page 1 of 1

It is certified that error appears in the above-identified patent and that said Letters Patent is hereby corrected as shown below:

In the Specification

In Column 5, Line 6, delete "$(\lambda_e)$" and insert --$(\lambda_c)$--, therefor.

Signed and Sealed this
Tenth Day of April, 2018

Andrei Iancu
*Director of the United States Patent and Trademark Office*